United States Patent [19]

Fuchs, Jr.

[11] Patent Number: 4,514,121

[45] Date of Patent: Apr. 30, 1985

[54] CHAMFERING APPARATUS

[76] Inventor: Francis J. Fuchs, Jr., 593 104th Ave., Naples, Fla. 33940

[21] Appl. No.: 461,154

[22] Filed: Jan. 26, 1983

[51] Int. Cl.³ ............................................... B23C 3/12
[52] U.S. Cl. ...................................... 409/138; 408/42; 408/152; 408/211; 409/139
[58] Field of Search .............. 409/137, 138, 139, 191, 409/192, 203, 217, 140; 408/38, 42, 49, 53, 211, 152, 223, 224, 225; 29/33 T

[56] References Cited

U.S. PATENT DOCUMENTS

| | | | |
|---|---|---|---|
| 1,904,950 | 4/1933 | Neckerman | 409/139 X |
| 3,228,268 | 1/1966 | Strout | 408/211 X |
| 3,292,493 | 12/1966 | Franklin | 409/138 |
| 3,992,123 | 11/1979 | Uyetake et al. | 408/104 |

FOREIGN PATENT DOCUMENTS

| | | | |
|---|---|---|---|
| 2518187 | 11/1976 | Fed. Rep. of Germany | 408/211 |
| 2658344 | 6/1978 | Fed. Rep. of Germany | 408/211 |
| 571375 | 1/1976 | Switzerland | 408/211 |

Primary Examiner—William R. Briggs
Assistant Examiner—Glenn L. Webb
Attorney, Agent, or Firm—R. Gale Rhodes, Jr.

[57] ABSTRACT

Chamfering apparatus for simultaneously chamfering the I.D. and O.D. of tubular members including an internal cutter for chamfering the I.D. and an external cutter for simultaneously chamfering the O.D., the internal and external cutters being mounted self-adjustably to permit them to simultaneously engage the I.D. and O.D. of tubular members of different I.D.'s and O.D.'s up to a predetermined maximum I.D. and O.D. and to minimize the net torque imparted to the tubular members by such simultaneous chamfering.

7 Claims, 7 Drawing Figures

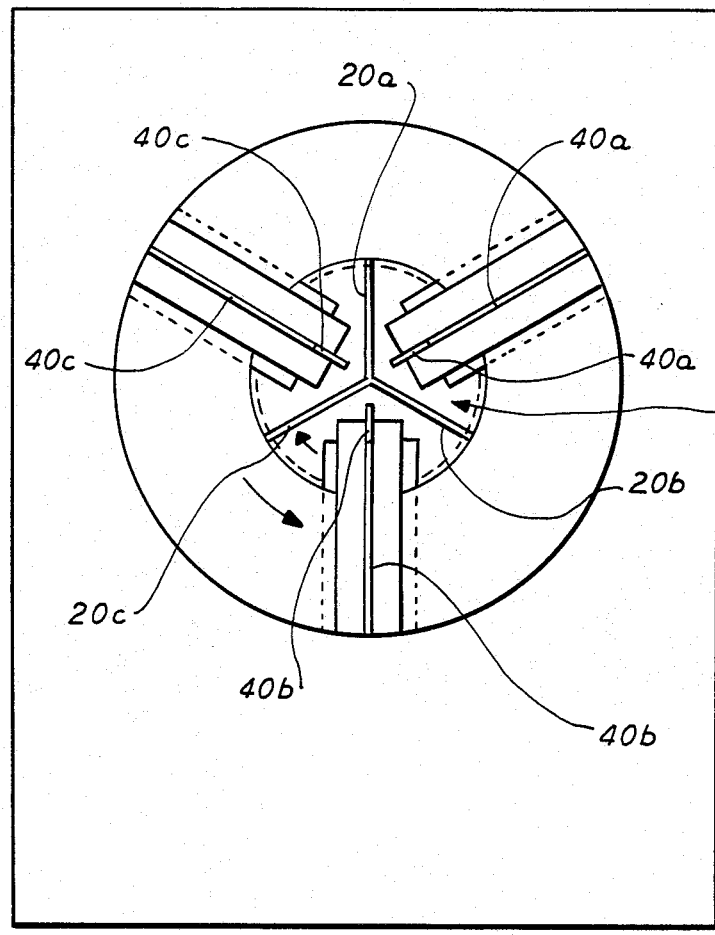
FIG. 2
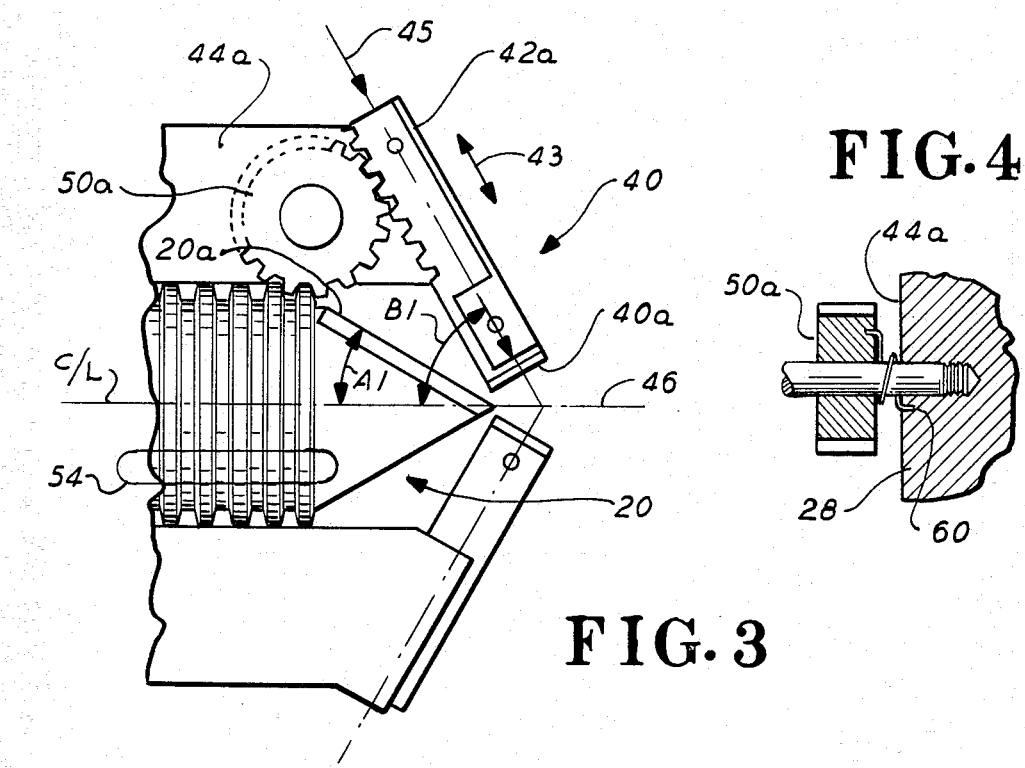
FIG. 3
FIG. 4

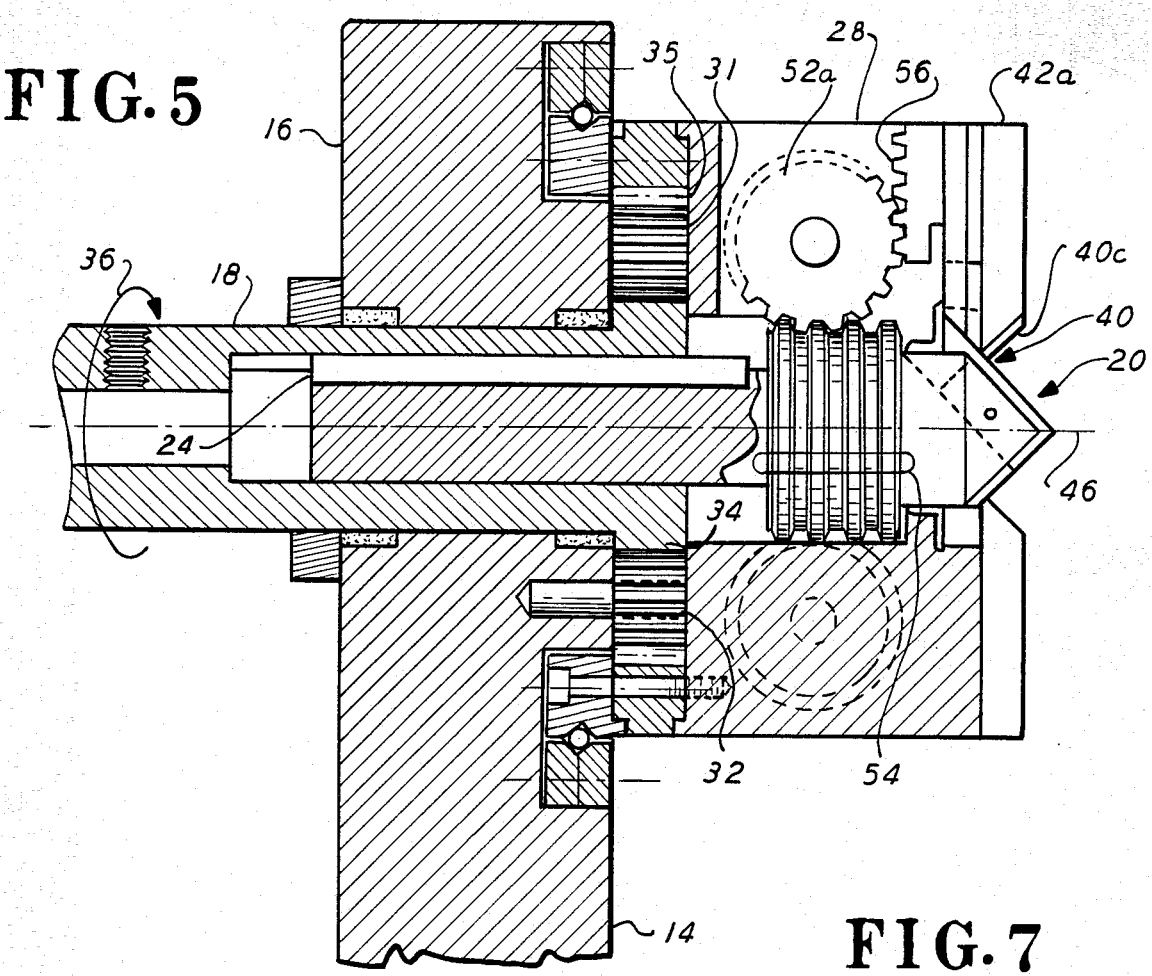
FIG. 5
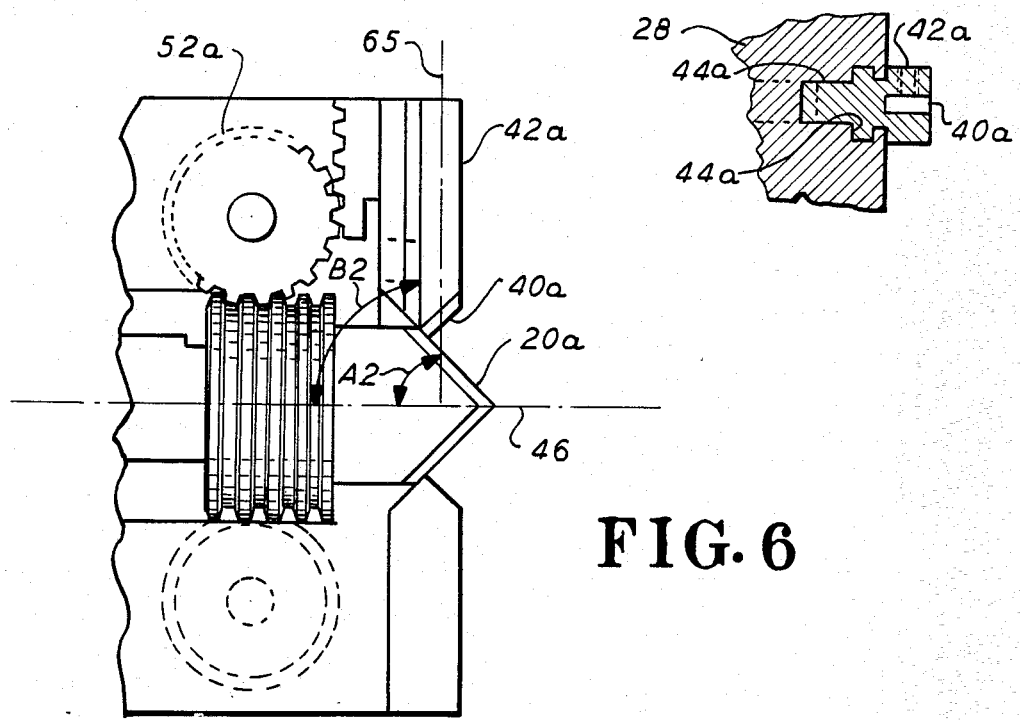
FIG. 7
FIG. 6

CHAMFERING APPARATUS

BACKGROUND OF THE INVENTION

This invention relates generally to improved chamfering apparatus and more particularly relates to improved chamfering apparatus for simultaneously chamfering the I.D. and O.D. of a tubular member with a minimum of net torque being applied to the tubular member due to the simultaneous chamfering process and which improved chamfering apparatus is self-adjustable to accommodate a large range of tubular members of different I.D.'s and O.D.'s.

The prior art is replete with chamfering apparatus of many types. Such types include chamfering apparatus for simultaneously chamfering the I.D. and O.D. of a tubular member and which are adjustable to simultaneously chamfer the I.D. and O.D. of tubular members of different sizes but such adjustability requires the apparatus to be adjusted and set for each different size of tubular member. Further, in addition to only providing adjustability within a very limited range, such prior art apparatus for the simultaneous chamfering of the I.D. and O.D. of tubular members impart net torque to the tubular members requiring the tubular members to be chucked or otherwise mounted stationarily during the simultaneous chamfering process. The requirement of present availability of a large number of chamfering apparatus of different sizes, and the requirement for the stationary mounting of the tubular member during simultaneous chamfering, brings unwanted and undesirable expense to such prior art simultaneous chamfering apparatus.

Accordingly, it is the object of the present invention to provide improved chamfering apparatus for simultaneously chamfering the I.D. and O.D. of the tubular member without imparting net torque to the tubular member and which such chamfering apparatus is self-adjustable to permit the simultaneous chamfering of the I.D. and O.D. of a large range of tubular members of different sizes.

SUMMARY OF THE INVENTION

The foregoing object is satisfied by the new and improved chamfering apparatus of the present invention which minimizes the net torque imparted to the tubular member due to the simultaneous chamfering operation by rotating the I.D. chamfering member in one direction and rotating the O.D. chamfering member in the opposite direction; the chamfering apparatus is self-adjustable to permit the I.D. and O.D. chamfering members to chamfer the I.D. and O.D. of tubular members of different I.D.'s an O.D.'s up to a predetermined maximum I.D. and O.D.

DESCRIPTION OF THE DRAWINGS

FIG. 2 is a full, elevational end view of the apparatus of FIG. 1;

FIG. 3 is a partial view of the embodiment of FIG. 1 illustrating an essential feature of the improved chamfering apparatus of the present invention;

FIG. 4 is a partial view of the apparatus of FIG. 1 illustrating a further feature of the present invention;

FIG. 5 is a partial, cross-sectional, side elevational view of an alternate embodiment of improved chamfering apparatus of the present invention;

FIG. 6 is a view similar to FIG. 3 but pertaining to the alternate embodiment of the improved chamfering apparatus of the present invention illustrated in FIG. 5; and FIG. 7 is a transverse cross-sectional view of a portion of FIG. 5 taken parallel to the centerline of FIG. 5 and illustrating the slidable mounting of a carrier member and an external cutter blade.

DESCRIPTION OF THE PREFERRED EMBODIMENTS

Figure 1:
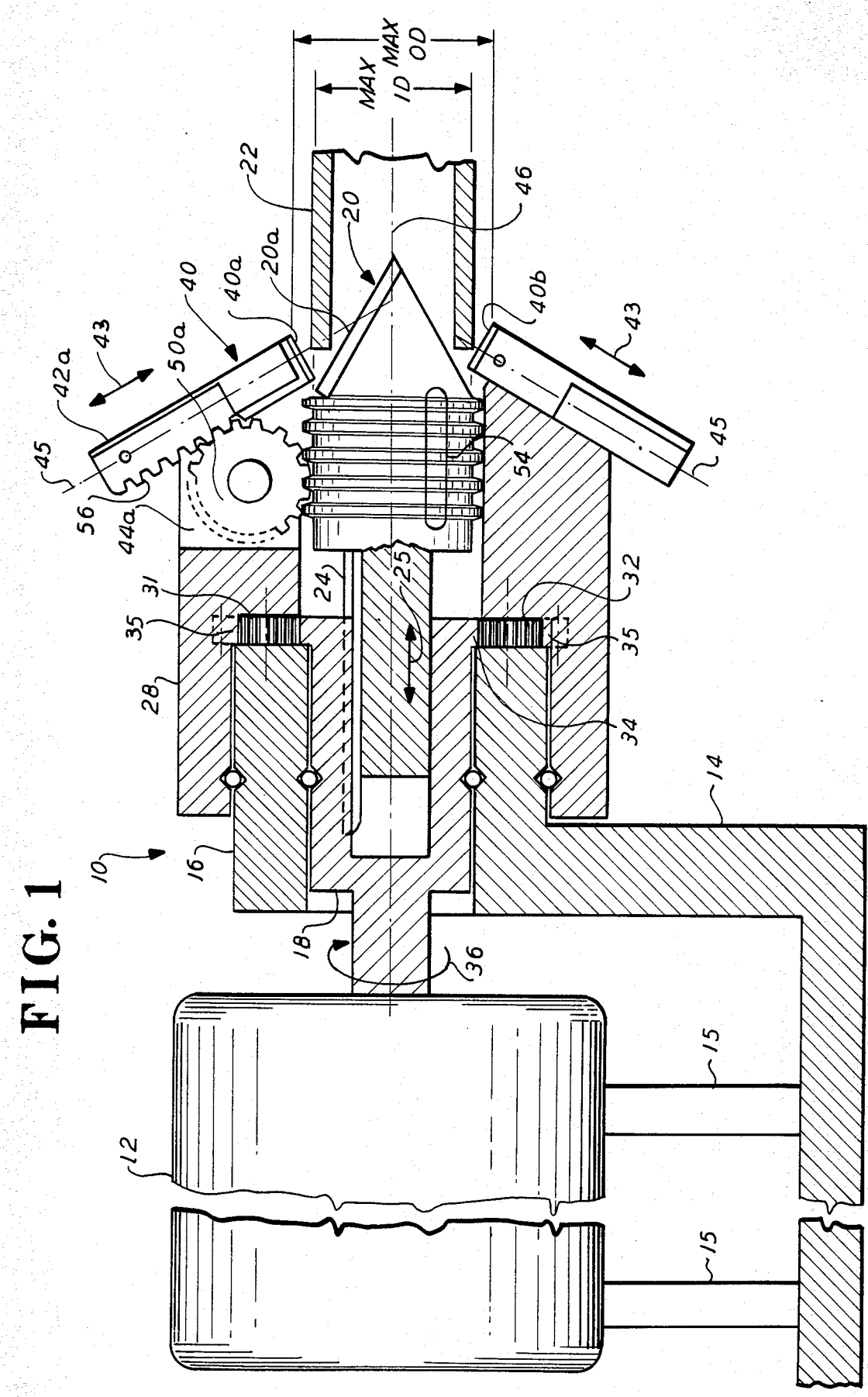
FIG. 1 is a cross-sectional, side elevational view of one embodiment of chamfering apparatus embodying the present invention.

Referring now to FIG. 1, there is shown improved chamfering apparatus embodying the present invention and indicated by general numerical designation 10. Such chamfering apparatus may include an electrical motor 12 and a stationary frame 14. The motor may be any one of several electrical motors known to the prior art which will be selected in the manner known to those skilled in the art in accordance with its power and speed characteristics as may be required for the practice of the present invention; the motor 12 may be suitably mounted on the frame 14 by suitable mounting members 15—15. The frame 14 includes an upper journal portion 16 and the chamfering apparatus further includes a hollow shaft 18 suitably journalled in the journal portion 6 of the stationary frame 14, as shown; the hollow shaft 18 is connected to the drive shaft of the motor 12 by suitable means not shown. An internal cutter indicated by general numerical designation 20, for engaging and chamfering the I.D. of a tubular member, such as tubular member 22 partially shown in FIG. 1, is mounted in the hollow shaft 18 by a key 24 residing in a suitable keyway shown in dashed outline, for rotation of the cutter 20 with the hollow shaft 18 and for sliding reciprocating linear axial movement with respect to the hollow shaft 18 in the directions of the double headed arrow 25. In the embodiment of FIG. 1, and as may be better seen in FIG. 2, the internal cutter 20 includes three inclined internal cutter blades 20a, 20b and 20c with adjacent blades being angularly displaced with respect to each other at 120°. A rotatable housing 28 surrounds the journal portion 16 of the stationary frame 14 for rotation with respect thereto on suitable bearings as shown. A pair of diametrically opposed, idler gears 31 and 32 are suitably mounted on the rightward end of the journal portion 16 for free simultaneous rotation in unison in either the clockwise or counterclockwise direction. The idler gears 31 and 32 simultaneously engage a circular external gear 34 provided externally on the forward portion of the hollow shaft 16 and a circular internal gear 35, as shown in dashed outline in FIG. 1, provided internally on the interior of the rotatable housing 28. Accordingly, it will be understood that upon clockwise rotation being imparted to the hollow shaft 18, as indicated by arrow 36 in FIG. 1, the external gear 34 provided on the hollow shaft 18 will impart counterclockwise rotation simultaneously to the idler gears 31 and 32 which idler gears will in unison simultaneously impart counterclockwise rotation to the rotatable housing 28 due to the engagement of the idler gears 31 and 32 with the internal gear 35 provided on the rotatable housing 28. Thus, due to the keyway engagement between the internal cutter 20 and the hollow shaft 18 which causes the internal cutter 20 to rotate in the same direction as the hollow shaft 18, upon the internal cutter rotating in either direction of rotation the rotatable housing 28 will rotate in the opposite direction. Mounted on the rotatable housing 28 for rotation therewith and in the same direction of rotation, is an external cutter indicated by general numerical designation 40 and which external cutter, as may be best seen in FIG. 2, is mounted concentrically with respect to the internal cutter 20 and, in the embodiment of FIG. 1, includes three inclined external cutter blades 40a, 40b and 40c with adjacent blades being angularly displaced with respect to each other at 120°. Each external cutter blade 40a, 40b and 40c is mounted fixedly in a carrier member 42a, 42b and 42c, respectively, and each carrier member, as may be best seen in FIG. 1 with respect to carrier member 42a, is mounted slidably in a slot 44a formed in the rotatable external housing 28 for generally radial reciprocating linear movement, in the direction of the double-headed arrows 43—43, along a direction of movement indicated by line 45 with respect to the direction of the linear axial movement of the internal cutter 20 along its centerline 46. The mounting of the carrier members 42a, 42b and 42c is described in more detail below with respect to the alternate embodiment of FIG. 5 and as shown in detail in FIG. 6. Mounted in each slot 44a, 44b and 44c, and as shown in detail in FIG. 1 with regard to slot 44a, is a freely rotatable idler gear, such as idler gear 50a, shown in FIG. 1. The idler gear 50a is in simultaneous engagement with a plurality of parallel external threads 54 provided on the exterior of the internal cutter member 20 and a linear gear rack 56 provided on the slidably mounted carrier member 42a; the idler gear 50a and carrier member 42a function in a rack and pinion manner. Thus, it will be understood, that upon the internal cutter 20 being provided with linear axial movement in either direction of movement indicated by the double headed arrow 25 of FIG. 1, rotation will be imparted to the idler gear 50a which will impart generally radial linear movement to the carrier member 42a along the line 45 with respect to the centerline 46 of the internal cutter 20; more particularly, upon the internal cutter 20 being provided with leftward linear axial movement, clockwise rotational movement will be imparted to the idler gear 50a by the external threads 54 and the idler gear 50a will impart generally radial downward linear movement to the carrier 42a, and hence to the cutter member 40a, along the line 45 with respect to the centerline 46 of the internal cutter 20, and upon the internal cutter 20 being provided with rightward linear axial movement, counterclockwise rotational movement will be imparted to the idler gear 50a by the external threads 54 and the idler gear 50a will impart generally radially upward linear movement to the carrier 42a, and hence to the cutter member 40a, along the line 45 with respect to the centerline 46 of the internal cutter 20. Similarly, it will be understood that upon the external cutter being provided with generally radial linear movement along the line 44 in either direction of movement indicated by the double headed arrow 43 of FIG. 1, rotation will be imparted to the idler gear 50a which will impart linear axial movement to the internal cutter 20a along the centerline 46. More particularly, upon the external cutter member 40a being provided with generally outward radial linear movement along the line 45, counterclockwise rotation will be imparted to the intermediate idler gear 50a which will in turn impart rightward linear axial movement to the internal cutter 20; conversely, upon generally downwardly radial linear movement being imparted to the external cutter 40a, clockwise rotational movement will be imparted to the intermediate idler gear 50a which will impart leftward axial movement to the internal cutter 20 along the centerline 46.

A discovery and essential feature of the present invention is embodied in the apparatus illustrated in detail in FIG. 3. It will be noted that the inclined internal cutter blade 20a is inclined at an angle A1 with respect to the centerline 46 along which the internal cutter 20 moves linearly and that the line 45, along which the external cutter blade 40a and carrier member 42a move linearly, is inclined at an angle B1 with respect to the centerline 46. It has been discovered that upon the angle B1 being twice the magnitude of A1, that upon a given amount of linear movement being provided to the internal cutter 20 along the centerline 46 the same given amount of linear movement will be imparted to the external cutter 40 along the line 45 by the intermediate idler gears 50. It has been found that this angular relationship permits the internal cutter blades 20a, 20b and 20c and external cutter blades 40a, 40b and 40c to simultaneously engage the I.D. and O.D. of a tubular member, such as tubular member 22 shown in FIG. 1, without interfering or engaging each other.

It will be recalled that upon clockwise rotation being imparted to the internal cutter 20, counterclockwise rotation is imparted to the external rotatable housing 28 and since the external cutter blade 40 is mounted on the housing 28, counterclockwise rotation, or rotation opposite to that of the internal cutter 20, will be imparted to the external cutter blades 40a, 40b and 40c. Hence, it will be understood that upon such opposite direction being imparted to the internal and external cutters, and as may be best seen in FIG. 1, that the internal cutter blade 20 will rotatably engage and chamfer the I.D. of the tubular member 22 while the external cutter blade 40 will simultaneously rotatably engage and chamfer the I.D. of the tubular member 20 and, since the internal cutter 20 and external cutter 40 are rotating in opposite directions, a minimum net torque will be imparted to the tubular member 22 thereby eliminating any need for the tubular member to be chucked or mounted stationarily during simultaneous chamfering and, more importantly, permitting the tubular member 20 to be readily held manually for such simultaneous I.D. and O.D. chamfering.

Referring further to FIG. 1, it will be further understood that the chamfering apparatus of the present invention for simultaneously chamfering the I.D. and O.D. of the tubular member is self-adjustable to permit the apparatus to simultaneously chamfer the I.D.'s and O.D.'s of tubular members having the maximum I.D. and O.D. illustrated at the extreme right in FIG. 1. With further regard to the self-adjustable feature of the present invention, it will be appreciated that upon a tubular member first engaging either the internal cutter 20 or the external cutter 40 that such first engagement will impart linear movement to the other cutter, through the intermediate idler gear 50a, etc. and the other cutter, whether internal cutter or external cutter, will be moved linearly to immediately engage the other of the O.D. or I.D. of the tubular member to provide for the simultaneous chamfering of the I.D. and O.D. of the tubular member.

Another feature of the present invention, which may be provided, is illustrated in FIG. 4. The carrier members 42a, 42b and 42c, and hence the external cutter blades 40a, 40b and 40c, may be placed in a balanced condition along the line 45 so as to cause such carrier members and external cutter blades to remain in any position along the line 45 upon being placed there, and not being forced or slung radially outwardly by the centrifugal force upon rotation thereof. To accomplish this, the intermediate idler gears 50, such as intermediate idler gear 50a of FIG. 4, may be suitably provided with a torsion spring 60 interconnected between the idler gear 50a and the rotatable housing 28 in a slot such as slot 44a. By proper choice of stiffness and direction of rotational orientation, both within the purview of one of ordinary skill in the art, the radially inwardly directed force provided to the idler gear 50a by the torsion spring 60 can be made to be the same, or substantially the same, as the radially outward force provided to the carrier member 42a and blade 40a by centrifugal force upon rotation thereof.

The alternate embodiment of the chamfering apparatus of the present invention, shown in FIGS. 5-7, is substantially the same as the invention embodiment shown in FIGS. 1-4 except that the external cutter blades 40a, 40b and 40c of the external cutter 40 are not inclined for linear movement at an angle, angle B1, with respect to the centerline 46 along which the internal cutter 20 moves linearly, but instead are mounted for perpendicular radial reciprocating linear movement with respect to the centerline 46, as may be seen in FIG. 5. Referring to FIG. 6, it will be noted that in this embodiment the same relative angular relationship exists between the line 65 along which the external cutter blade 40a moves linearly with respect to the centerline 46 and the angle of inclination of the internal cutter blade 20a with respect to the centerline 46, namely, angle B2, the angle of the line 65 with respect to the centerline 46, is also twice the magnitude of the angle A2 which is the angle of inclination of the internal cutter blade 20a with respect to the centerline 46, more specifically angle B2 being 90° and angle A2 being 45°. Hence, this doubled angular relationship, or half angular relationship, provides the same structural relationships and the same respective linear movement relationships between the external cutter 20 and the internal cutter 40 as with regard to the earlier described embodiment.

Attention is now directed to FIG. 7 for a more complete understanding of the slidable mounting of the carrier members 42, and in particular the slidable mounting of the carrier member 42a and external cutter blade 40a as shown in FIG. 7. It will be noted that the carrier member 42a, in transverse cross-section, is provided with a generally T-shaped rearward portion which is slidably received within a complementary T-shaped slot 44a provided in the rotatable housing 28; the carrier members and external cutter blades of the earlier embodiment are similarly mounted in the rotatable housing 28 but due to their being mounted at an angle in the housing, details of their mounting were not shown to prevent any confusion that might have been caused by lines showing the incline mounting.

Referring again to the double angular, or half angular, relationship between the angle of the line along which the external cutter blades move with respect to the centerline along which the internal cutter moves, and the angle of inclination that the internal cutter plays with respect to the centerline, it will be further appreciated from FIG. 3 that such angular relationships permit the internal cutter blades and external cutter blades to be placed in close proximity, without interference, as shown in FIG. 3, to permit the simultaneous chamfering of the I.D. and O.D. of thin walled tubular members.

Referring again to FIG. 5, another feature of the present invention may be provided, which feature prevents chamfering debris from entering the interior of the chamfering apparatus. As shown in FIG. 5, a generally annular protection ring 70, provided with a radially outwardly extending flange 72, may be provided between the internal cutter 20 and the interior of the chamfering apparatus 10 to prevent debris produced by the internal and external chamfering blades from entering the interior of the chamfering apparatus and clogging the internal apparatus, particularly the idler gears.

It will be understood that many variations and modifications may be made in the present invention without departing from the spirit and the scope thereof.

What is claimed is:

1. Chamfering apparatus for simultaneously chamfering the I.D. and O.D. of the ends of tubular members, comprising:
   first chamfering means for chamfering said I.D.;
   second chamfering means for chamfering said O.D,; and
   mounting means for mounting said first and second chamfering means including means for dependently feeding said first and second chamfering means whereby upon the end of a tubular member first engaging either said first chamfering means or said second chamfering means movement will be imparted to the other of said chamfering means to cause the other chamfering means to engage said end of said tubular member whereby the I.D. and O.D. of the end of said tubular member are simultaneously chamfered and including means for imparting counter rotation to said first and second chamfering means to minimize net torque imparted to said tubular members by said simultaneous chamfering.

2. Chamfering apparatus according to claim 1 wherein said first means comprise rotatable internal cutting means for engaging and chamfering said I.D.; wherein said second means comprise rotatable external cutting means for engaging and chamfering said O.D.; and wherein said mounting means comprise: (i) first mounting means including means for mounting said internal cutting means rotatably for rotation in a first direction of rotation and means for mounting said internal cutting means for reciprocating linear axial movement, and (ii) second mounting means including carrier means for mounting said external cutting means concentrically with respect to said rotatable internal cutting means and for rotation in a second direction of rotation opposite to said first direction of rotation to minimize net torque imparted to said tubular members, and means for mounting said external cutting means for generally radial reciprocating linear movement along a predetermined direction of movement with respect to said linear axial movement of said internal cutting means to maintain said internal and external cutting means in sufficient proximity to cause said internal and external cutting means to simultaneously engage and chamfer said I.D. and O.D. of said tubular members of said different I.D.'s and O.D.'s up to said predetermined maximum I.D. and O.D. and to prevent interference between said internal and external cutting means during said simultaneous chamfering.

3. Chamfering apparatus according to claim 2 wherein said mounting means further include first idler gear means interconnecting said first and second mounting means to cause said second mounting means to rotate in said second direction of rotation upon said internal cutting means rotating in said first direction of rotation and second idler gear means interconnecting said internal cutting means and said carrier means to cause the same amount of linear movement to be imparted to said internal cutting means and said carrier means upon either of said internal cutting means or said carrier means moving linearly.

4. Chamfering apparatus according to claim 2 wherein said rotatable internal cutting means has a centerline and includes a plurality of outwardly extending internal cutting members each having a straight edge inclined at a first predetermined centerline angle with respect to said centerline and wherein said carrier means comprise a plurality of carrier members and wherein said rotatable external cutting means comprise a plurality of outwardly extending external cutting members, each of said external cutting members mounted on one of said carrier members and each of said carrier members mounted on said second mounting means at a second predetermined centerline angle with respect to said centerline to cause said predetermined direction of movement of said external cutting means to be at said second predetermined centerline angle with respect to said centerline, said second predetermined centerline angle being twice the magnitude of said first predetermined centerline angle.

5. Chamfering apparatus according to claim 1 wherein said chamfering produces debris and wherein said chamfering apparatus further comprises protection means for preventing said debris from entering said mounting means.

6. Chamfering apparatus according to claim 3 wherein said rotatable internal cutting means includes a conical head and a cylindrical portion rearward of said head, and further includes an annular protection ring mounted on said cylindrical portion and including a radially outwardly extending flange providing a shield between said internal cutting means and said external cutting means and the interior of said mounting means to prevent debris produced by said chamfering to enter said mounting means and clog said idler gear means.

7. Chamfering apparatus according to claim 2 wherein rotation of said external cutting means produces centrifugal force tending to move said carrier means radially outwardly along said predetermined direction of movement, and wherein said chamfering apparatus further includes biasing means for applying force to said carrier means tending to move said carrier means radially inwardly along said predetermined direction of movement whereby the difference between said centrifugal force and said force provided by said biasing means is substantially zero at all positions of said carrier means along said predetermined direction of movement whereby said carrier means tend to move easily in either direction of movement along said predetermined direction of movement upon either the internal cutting means or the external cutting means respectively engaging either the O.D. or I.D. of the tubular members.

* * * * *